(12) United States Patent
Pilette et al.

(10) Patent No.: US 8,899,498 B2
(45) Date of Patent: Dec. 2, 2014

(54) AUTOMOTIVE FLUID DISTRIBUTION SYSTEM

(75) Inventors: Thomas Mark Pilette, Lake Orion, MI (US); Kimberly Catherine Knapp, Windsor (CA); Anthony John Povinelli, Romeo, MI (US)

(73) Assignee: Magna International Inc., Toronto (CA)

( * ) Notice: Subject to any disclaimer, the term of this patent is extended or adjusted under 35 U.S.C. 154(b) by 1075 days.

(21) Appl. No.: 12/532,427

(22) PCT Filed: Mar. 14, 2008

(86) PCT No.: PCT/CA2008/000471
§ 371 (c)(1),
(2), (4) Date: Feb. 17, 2010

(87) PCT Pub. No.: WO2008/116287
PCT Pub. Date: Oct. 2, 2008

(65) Prior Publication Data
US 2010/0140378 A1    Jun. 10, 2010

Related U.S. Application Data

(60) Provisional application No. 60/920,038, filed on Mar. 26, 2007.

(51) Int. Cl.
| | | |
|---|---|---|
| *B65B 1/04* | (2006.01) | |
| *B65B 3/04* | (2006.01) | |
| *B67C 3/00* | (2006.01) | |
| *B05B 1/10* | (2006.01) | |
| *B60S 1/46* | (2006.01) | |
| *B60S 1/50* | (2006.01) | |

(52) U.S. Cl.
CPC ..................................... *B60S 1/50* (2013.01)
USPC ......... 239/284.1; 239/309; 239/302; 141/363

(58) Field of Classification Search
USPC ............ 239/284.2, 302, 309, 284.1; 141/330, 141/363–366
See application file for complete search history.

(56) References Cited

U.S. PATENT DOCUMENTS

| | | | | |
|---|---|---|---|---|
| 1,426,180 | A | * | 8/1922 | Gotfredsen .................. 222/83.5 |
| 1,635,563 | A | * | 7/1927 | Sanford ..................... 184/105.1 |
| 4,444,358 | A | | 4/1984 | Spohn et al. |
| 4,905,904 | A | * | 3/1990 | Ohara et al. ................ 239/284.1 |
| 4,941,806 | A | * | 7/1990 | Brown et al. .................... 417/38 |
| 5,186,606 | A | | 2/1993 | Egner-Walter et al. |
| 5,257,911 | A | | 11/1993 | Mota et al. |
| 5,343,903 | A | | 9/1994 | Winder |
| 5,555,007 | A | * | 9/1996 | Ceschin et al. ................. 347/87 |
| 5,810,247 | A | | 9/1998 | Petroff |
| 5,853,025 | A | | 12/1998 | Daneshvar |
| 6,042,023 | A | * | 3/2000 | Ask .............................. 239/272 |

(Continued)

FOREIGN PATENT DOCUMENTS

CA           1116131           1/1982

*Primary Examiner* — Justin Jonaitis
(74) *Attorney, Agent, or Firm* — Warn Partners, P.C.

(57) ABSTRACT

An automotive fluid distribution system 7 is provided which has a reservoir 10 for holding fluid. The reservoir 10 has a fill aperture 14. Encircling the fill aperture 14 is a grommet seal 16. A bracket 50 is provided that is generally positionally adjustable with respect to the fill aperture 14 to hold a bottle 26 adjacent to the reservoir 10.

22 Claims, 4 Drawing Sheets

(56) References Cited

U.S. PATENT DOCUMENTS

| | | | |
|---|---|---|---|
| 6,079,633 A * | 6/2000 | Inoue et al. ........................ 239/1 |
| 6,237,627 B1 | 5/2001 | Boule |
| 6,253,808 B1 * | 7/2001 | Amberg et al. ............... 141/330 |
| 6,298,519 B1 * | 10/2001 | Berge et al. ................ 15/250.03 |
| 6,435,837 B1 | 8/2002 | Lopez et al. |
| 6,530,758 B1 | 3/2003 | Ritter et al. |
| 6,675,989 B1 | 1/2004 | Ritter et al. |
| 2003/0006310 A1 * | 1/2003 | Rothrum et al. .............. 239/328 |

* cited by examiner

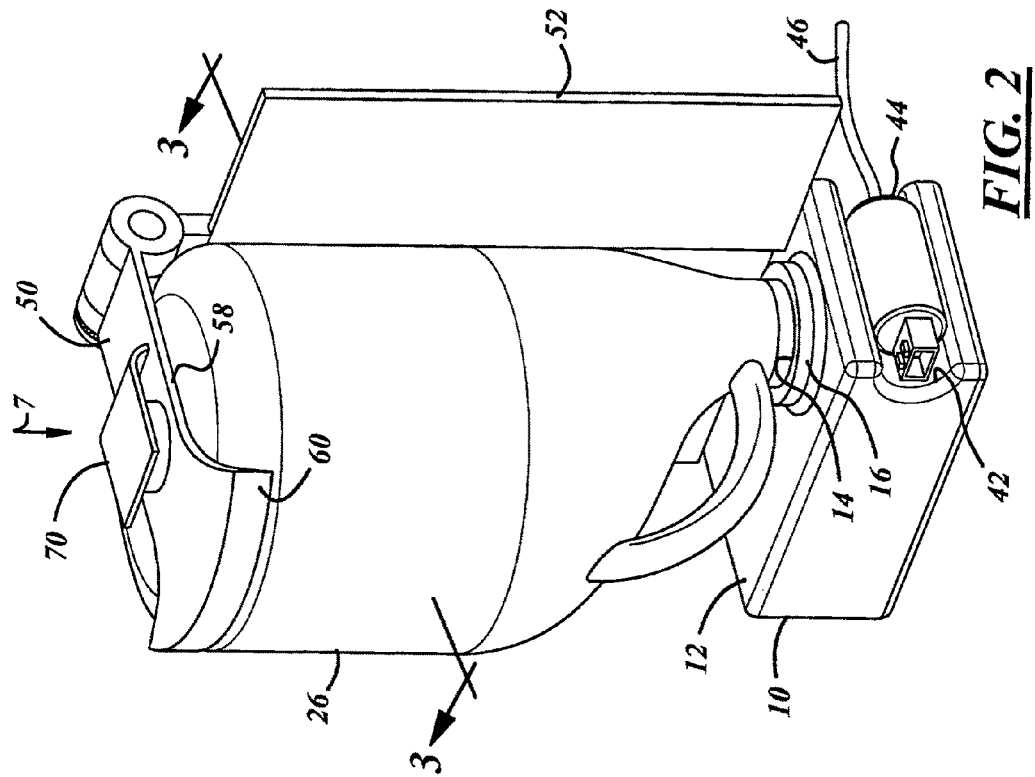
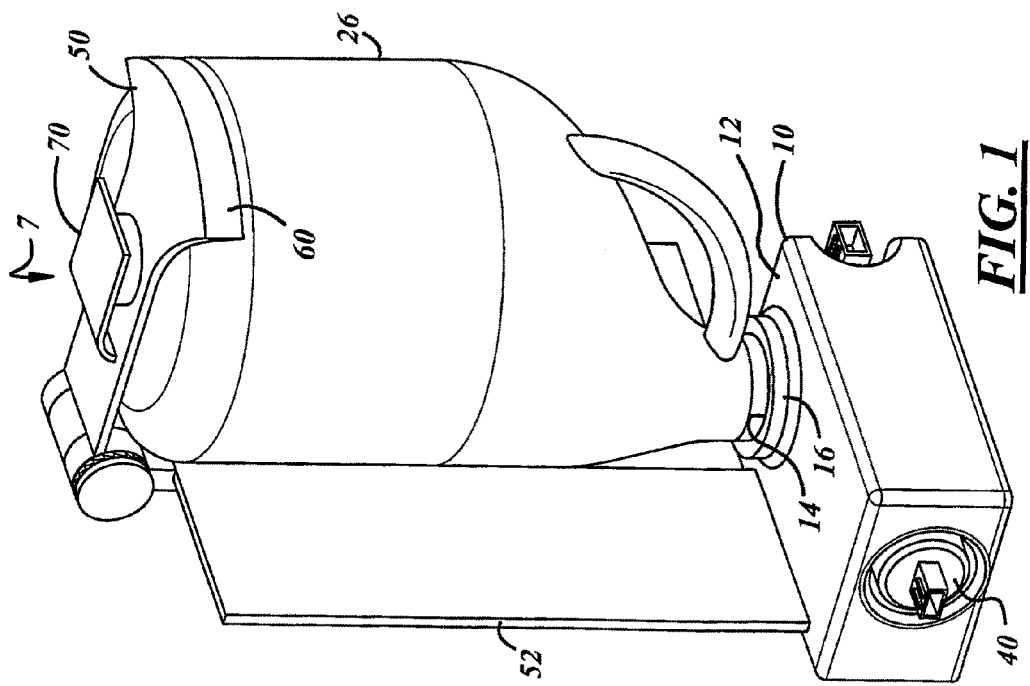

AUTOMOTIVE FLUID DISTRIBUTION SYSTEM

CROSS REFERENCE TO RELATED APPLICATIONS

This application is a National Stage of International Application No. PCT/CA2008/000471, filed Mar. 14, 2008. This application claims priority to U.S. Provisional Patent No. 60/920,038 filed on Mar. 26, 2007.

FIELD OF THE INVENTION

The present invention relates to fluid distribution systems for automotive vehicles. The present invention is particularly useful for windshield wiper fluid systems.

BACKGROUND OF THE INVENTION

Automotive vehicles use a plurality of fluids which require distribution systems. One particular type of automotive fluid which is commonly used in virtually all automotive vehicles is windshield wiper fluid. Typically, a windshield wiper fluid reservoir is placed within the engine compartment wherever space is available. To refill the windshield wiper fluid reservoirs a vehicle maintenance operator must first uncap a windshield wiper fluid bottle, secure an instrument to rupture a flexible aluminum seal, pour the windshield wiper fluid into a small aperture of a fill tube, while making sure that the punctured seal or portions thereof does not fall into the fill tube. The maintenance operator must also attempt to prevent the windshield wiper fluid from spilling into adjacent areas of the engine compartment to prevent the generation of an unpleasant order when windshield wiper fluid contacts a hot engine component. It is desirable to provide an automotive fluid distribution system, and in particular, a windshield wiper fluid distribution system which is more convenient to refill than those systems revealed previously.

SUMMARY OF THE INVENTION

To meet the above noted and other desires, an embodiment of the present invention is brought forth. The present invention includes an automotive fluid distribution system having a reservoir for holding fluid. The reservoir has a fill aperture. A grommet seal is provided which encircles the fill aperture. A bracket is provided. The bracket holds an automotive vehicle fluid bottle adjacent the reservoir. In one embodiment, the fill aperture has a pierce arm mounted therein so that as the operator connects the bottle with the fill aperture, a seal of the bottle is simultaneously ruptured.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a left side perspective view of an automotive fluid distribution system of the present invention;

FIG. 2 is a right side perspective view of the automotive fluid distribution system shown in FIG. 1;

DETAILED DESCRIPTION OF THE PREFERRED EMBODIMENTS

The following description of the preferred embodiment(s) is merely exemplary in nature and is in no way intended to limit the invention, its application, or uses.

Figure 3:
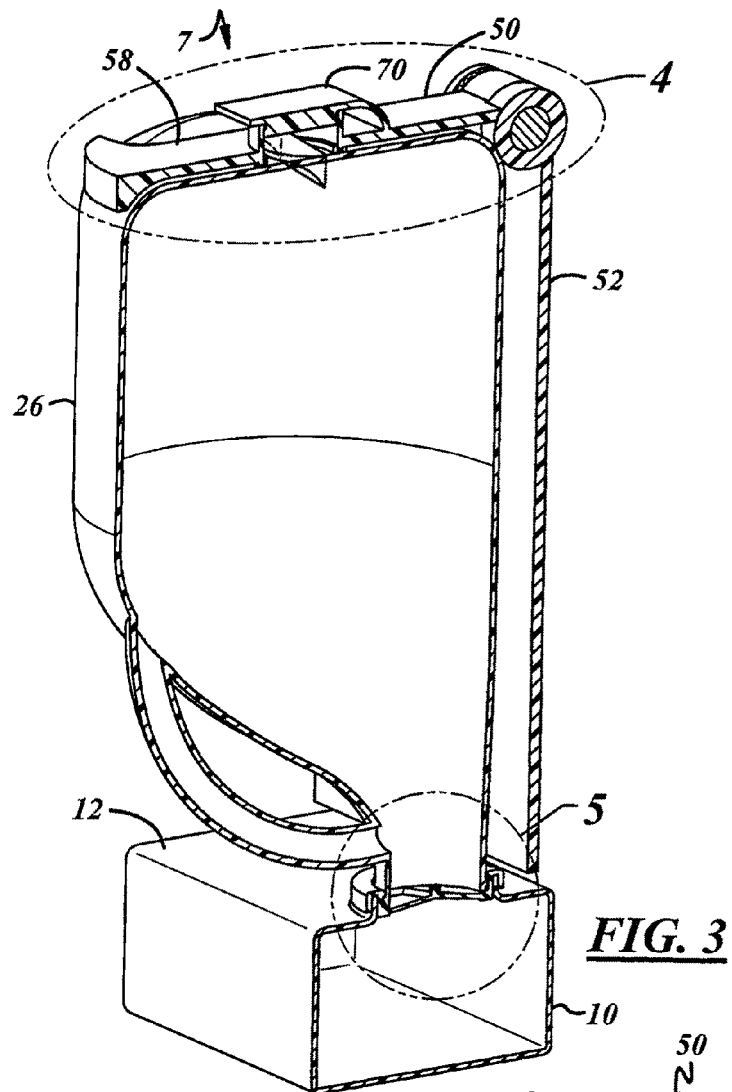
FIG. 3 is a sectional view taken along lines 3-3 of FIG. 2.
Figure 4:
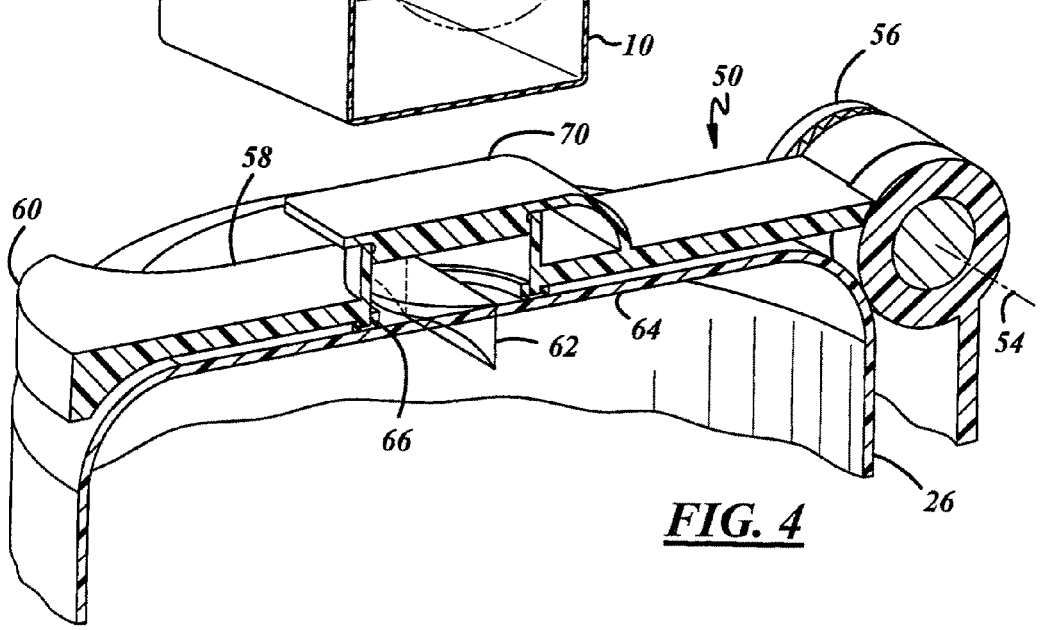
FIG. 4 is an enlargement of a portion of the automotive fluid distribution system shown in FIG. 3.
Figure 5:
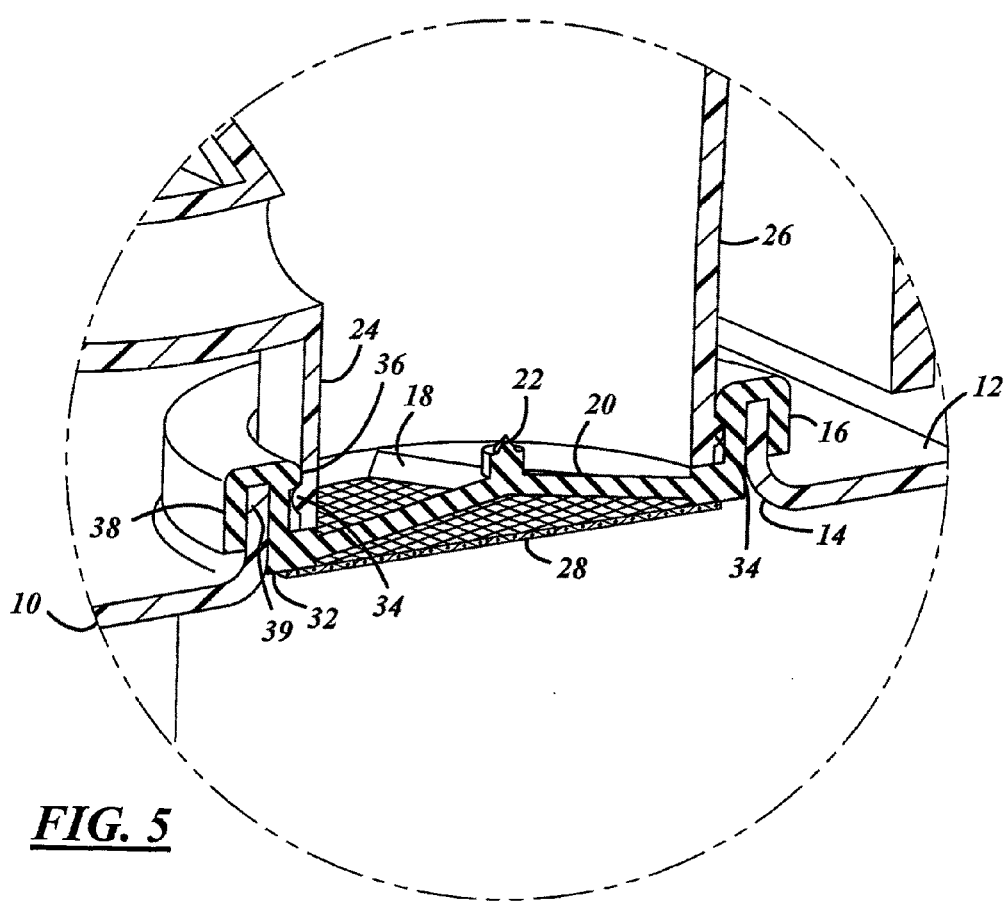
FIG. 5 is an enlargement of a portion of the automotive fluid distribution system shown in FIG. 3.

Referring to FIGS. 1-5 an automotive fluid distribution system 7 of the present invention has a reservoir 10. The reservoir 10 can be fabricated from a variety of materials including metal or a polymeric material. One material for the reservoir is blow molded plastic. The reservoir 10 along an upper surface 12 has a fill aperture 14. A grommet seal 16 encircles the fill aperture 14. The grommet seal 16 is typically fabricated from a generally elastomeric material. Mounted within the aperture 14 by the grommet seal 16 is a pierce arm 18. The pierce arm 18 has three or four legs 20 that support in a middle portion a piercing head 22 (FIG. 5). The piercing head 22 provides the function of rupturing a flexible aluminum seal (not shown) which is usually placed at an extreme end of an aperture opening 24 of a windshield wiper bottle 26. Connected with a bottom end of the grommet seal 16 is a screen 28 which ensures that portions of the flexible seal ruptured by the pierce arm 18 do not flow into the interior of the reservoir 10. In other embodiments (not shown) the pierce arm 18 can be formed integrally with the reservoir 10. In still other embodiments, the pierce arm 18 can be a separate piece that is adhesively joined to or molded with the grommet seal 16. The grommet seal 16 has an inner flange 32 that provides a support for the bottle 26. The bottle 26 has an opening with aperture lip 34. The lip 34 of the bottle has an over lip or snap fit relationship with a radially inward projecting lip 36 of the grommet seal. The grommet seal 16 also has a C-shaped section 38 to allow it to be positioned over a rim 39 of the reservoir 10.

The reservoir 10 at one end has connected thereto a fluid level sensor 40. On an opposite end of the reservoir 10, the reservoir has an indention 42. Positioned within the indentation 42 is a pump 44 having an outlet hose 46 which delivers windshield wiper fluid to the windshield wiper sprayers (not shown). The pump 44 is directly connected with the reservoir 10 via an opening which penetrates the indentation 42. The fluid sensor function can be combined with the fluid pump 44 eliminating the need for a separate fluid sensor 40. To hold or stabilize the bottle 26 with the reservoir 10, there is provided a bracket 50. The bracket 50 is positionally adjustable with respect to the fill aperture 14. The bracket 50 is optionally connected with a portion of a vehicle front end module 52. The bracket 50 pivots about a pivotal axis 54 and has a ratcheting mechanism 56 to allow an extending arm 58 to have ratchet positioning in a downward direction. The bracket extending arm 58 is therefore pivotal with respect to an installed bottle 26. The bottle 26 can be a permanent bottle, or can be a commercially replaceable item. The arm 58 has a cup portion 60 for stabilizing the bottle 26. The bracket arm 58 also has connected thereto a puncture head 62 for penetrating the bottle 26. The puncture head 62 is shaped to form a pivotal window in an extreme end 64 of the bottle when the bracket arm is ratcheted downward into position. The pivotal window formed in the generally extreme end of the bottle 64 allows for the passage of air into the interior of the bottle when the bottle's contents are being released into the reservoir 10. To seal the area adjacent to the puncture head 62, the bracket has a seal 66 that engages the bottle 64 adjacent the puncture head 62. The seal would typically be elastomeric. To allow for refill into the bottle 26 there is provided a refill cap 70.

Figure 7:
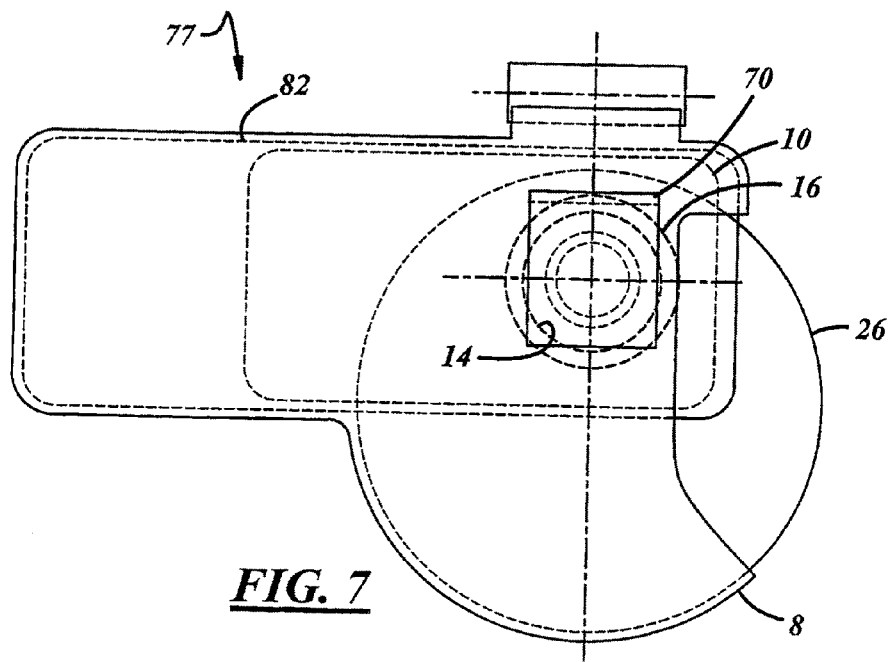
FIG. 7 is a top plan view of the fluid distribution system shown in FIG. 6.
Figure 6:
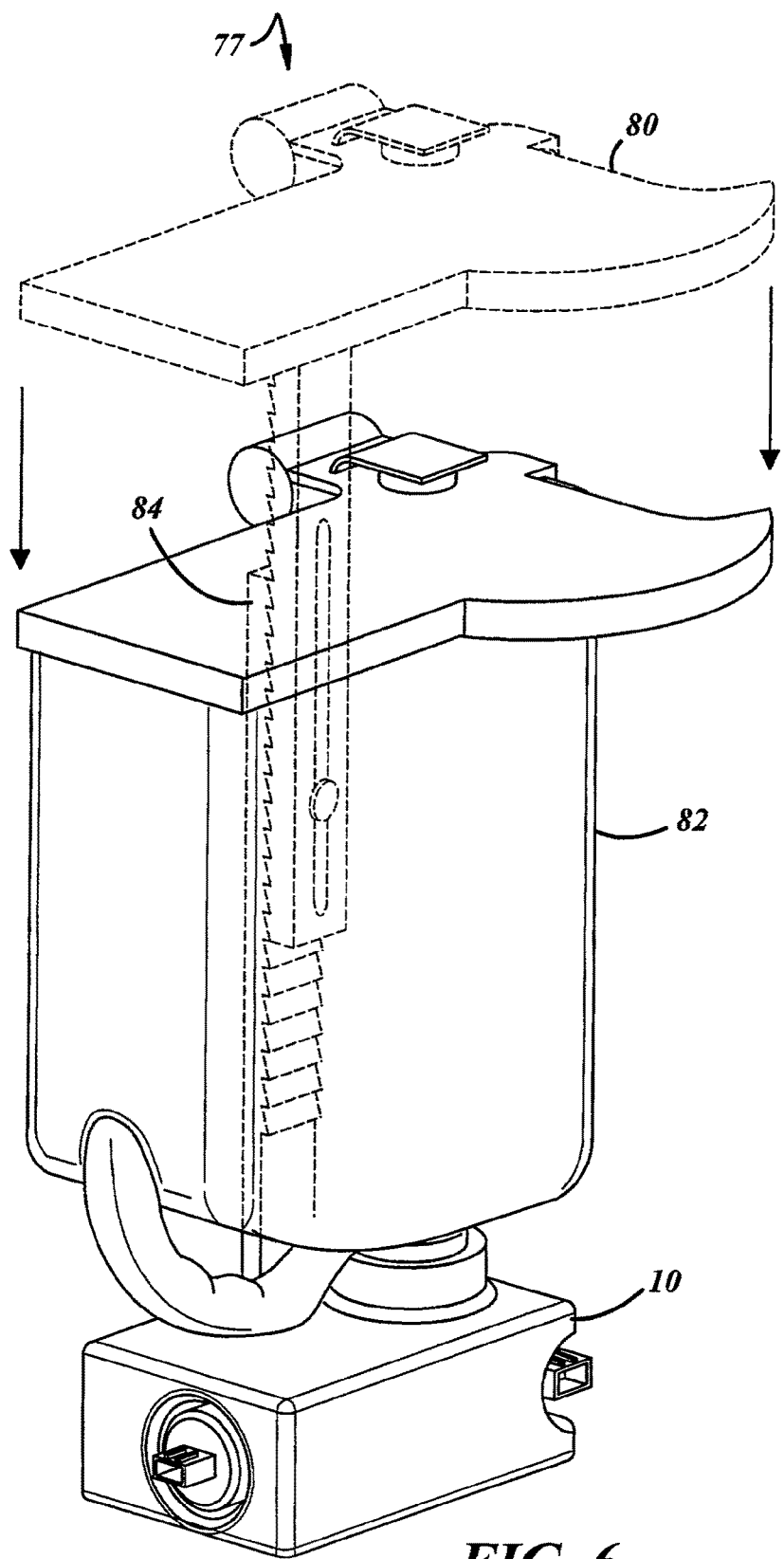
FIG. 6 is a perspective view of an alternate embodiment of the present invention which can accommodate fluid bottles having various shapes.

Referring in particular to FIGS. 6 and 7, an embodiment 77 of the present invention is provided having a bracket 80 that is translatable with respect to a bottle 82 and fill aperture 14. The bottle 82 is generally rectangular in this cross-section, as contrasted with the circular cross-section of the bottle 26. The bracket 80 is vertically ratchetable having a ratchet mechanism 84. The bracket 80 is configured for multiple shaped bottles being able to stabilize a bottle shaped as 26 or a bottle shaped like 82. The bottle shape 82 is more common for engine coolant type fluids. It will be apparent to those skilled in the art that bottles shaped similar to that of 26 which have an opening along their axial center line, can be accommodated by the present invention by simply allowing the bracket to adjust the position of the fill cap 70 along with that of the puncture head (not shown) and related seal, and also changing the position of the fill aperture 14. Slight modifications in the dimensions of the reservoir 10 may also be required.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive fluid distribution system comprising:
   a reservoir for holding fluid, said reservoir having a fill aperture;
   a grommet seal encircling said fill aperture;
   a bracket comprising an extending arm generally positionally adjustable with respect to said fill aperture to hold a bottle adjacent said reservoir and a cup portion for stabilizing said bottle;
   a refill cap extending into a passage extending through said extending arm; and
   a pump, where said reservoir has an indentation at one end of said reservoir and said pump is sized to be recessed within said indentation.

2. An automotive fluid distribution system as described in claim 1 further including a pierce arm mounted within said reservoir fill aperture for piercing a flexible seal of said bottle.

3. An automotive fluid distribution system as described in claim 2 wherein said pierce arm is connected with said grommet seal.

4. An automotive fluid distribution system as described in claim 1 wherein said bracket is pivotal with respect to a bottle held by said bracket.

5. An automotive distribution system as described in claim 4 wherein said bracket has ratchet positioning.

6. An automotive fluid distribution system as described in claim 1 wherein said bracket is translatable with respect to a bottle held by said bracket.

7. An automotive fluid distribution system as described in claim 6 wherein said bracket has ratchet positioning.

8. An automotive fluid distribution system as described in claim 1 wherein said system delivers windshield wiper fluid.

9. An automotive fluid distribution system as described in claim 1 wherein said bracket has a puncture head for penetrating said bottle.

10. An automotive fluid distribution system as described in claim 9 wherein said puncture head forms a pivotal window in said bottle.

11. An automotive fluid distribution system as described in claim 9, wherein said refill cap is adjacent said puncture head.

12. An automotive fluid distribution system as described in claim 9 wherein said bracket has a seal for engaging a bottle adjacent said puncture head.

13. An automotive fluid distribution system as described in claim 1, wherein said pump is directly connected to said reservoir via an opening which penetrates said reservoir.

14. An automotive fluid distribution system as described in claim 1 wherein said reservoir has a fluid level sensor.

15. An automotive fluid distribution system as described in claim 14, wherein said fluid level sensor is combined with said pump.

16. An automotive fluid distribution system as described in claim 1 having a screen mounted within said fill aperture.

17. An automotive fluid distribution system as described in claim 16 wherein said screen is connected with said grommet seal.

18. An automotive fluid distribution system as described in claim 1 wherein said grommet seal has an over lip relationship with a lip of said bottle.

19. An automotive fluid distribution system as described in claim 1, wherein said bracket can accommodate different bottle shapes.

20. An automotive fluid distribution system as described in claim 1 wherein said bracket is pivotal about a pivotal axis and has a ratcheting mechanism located about said pivotal axis to allow said extending arm to pivot in a downward direction with respect to a bottle.

21. An automotive fluid distribution system comprising:
   a reservoir for holding fluid, said reservoir having along an upper surface a fill aperture;
   a grommet seal encircling said fill aperture;
   a pierce arm mounted within said aperture for penetrating a flexible seal of said bottle;
   a bracket having ratchet positioning, said bracket having a puncture head for puncturing a pivotal window in said bottle, and said bracket having a refill cap; and
   a pump, where said reservoir has an indentation at one end of said reservoir and said pump is sized to be recessed within said indentation.

22. An automotive fluid distribution system comprising:
   a reservoir for holding fluid, said reservoir having a fill aperture;
   a grommet seal encircling said fill aperture;
   a bracket including an extending arm and a ratcheting mechanism, said bracket pivotably adjustable to pivot said extending arm with respect to said fill aperture such that said bracket contacts said bottle to hold and stabilize the bottle adjacent said fill reservoir;
   a refill cap extending into a passage extending through said extending arm; and
   a pump, where said reservoir has an indentation at one end of said reservoir and said pump is sized to be recessed within said indentation.

* * * * *